Figure 1:
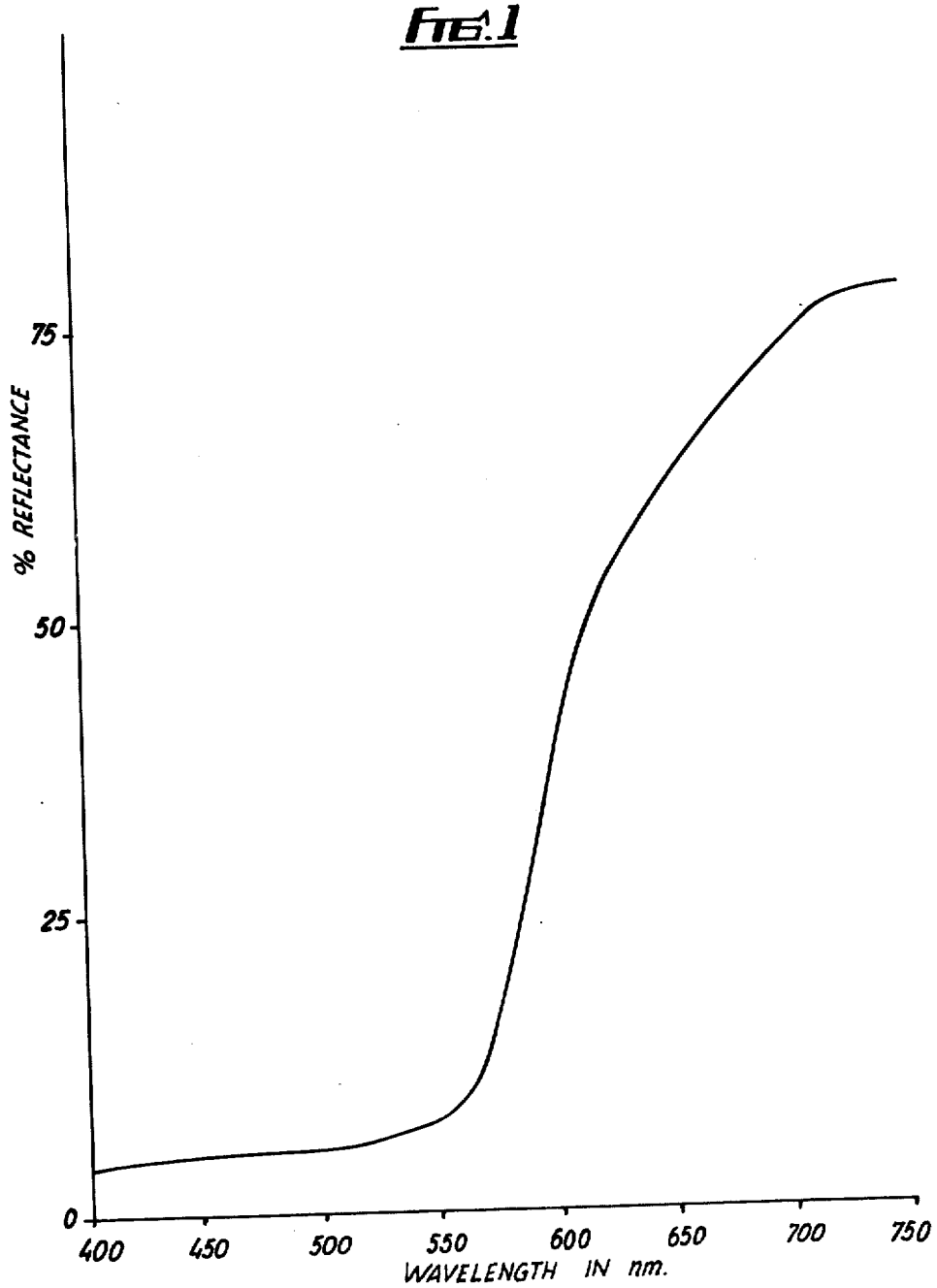

United States Patent [19]

Airey et al.

[11] Patent Number: 4,482,390
[45] Date of Patent: Nov. 13, 1984

[54] METHOD OF PROTECTING PIGMENTS WITH TRANSPARENT CRYSTALLINE ZIRCON

[75] Inventors: Anthony C. Airey; Andrew Spiller, both of Stoke-on-Trent, England

[73] Assignee: British Ceramic Research Association Limited, Stoke-on-Trent, England

[21] Appl. No.: 415,813

[22] Filed: Sep. 8, 1982

[30] Foreign Application Priority Data

Sep. 12, 1981 [GB] United Kingdom ............... 8127615

[51] Int. Cl.³ .................................................. C09C 3/06
[52] U.S. Cl. ................................. 106/308 B; 106/292; 106/293; 106/299; 106/301; 106/302; 423/326; 501/14; 501/17
[58] Field of Search ............... 106/299, 293, 292, 301, 106/302, 308 B; 423/326, 274

[56] References Cited

U.S. PATENT DOCUMENTS

| 3,802,900 | 4/1974 | Broll et al. ............ 106/299 |
| 3,808,019 | 4/1974 | Spange et al. ............ 106/308 B |
| 3,847,639 | 11/1974 | Broll et al. ............ 106/299 |
| 3,888,688 | 6/1975 | Broll et al. ............ 106/308 B |
| 4,008,091 | 2/1977 | Wagner et al. ............ 106/301 |

FOREIGN PATENT DOCUMENTS

| 1467302 | 5/1969 | Fed. Rep. of Germany ...... 423/326 |
| 2341829 | 2/1975 | Fed. Rep. of Germany ...... 106/301 |
| 2011366A | 7/1979 | United Kingdom ............ 106/299 |
| 2052462A | 1/1981 | United Kingdom ............ 423/326 |

Primary Examiner—Helen M. McCarthy
Attorney, Agent, or Firm—Fiddler & Levine

[57] ABSTRACT

Pigments which are unstable at high temperatures are protected by inclusion in zirconium silicate crystals. Improved protected pigments are produced by the step of precipitating the constituents of the protected pigments from aqueous or non-aqueous solution. Especially applicable to pigments for ceramics such as those containing cadmium and pigments for use in plastics where contamination of foodstuffs is to be avoided.

6 Claims, 2 Drawing Figures

METHOD OF PROTECTING PIGMENTS WITH TRANSPARENT CRYSTALLINE ZIRCON

The invention relates to a method of making a protected pigment especially suitable for firing on ceramics and for use in plastics, and a pigment made according to the method.

Many pigments especially those used in the ceramic and plastics industries are of limited colour and chemical stability. Such pigments may become unstable at elevated temperatures or in the presence of acids, resulting in a colour change and/or the release of toxic metals from the pigment. Cadmium sulphoselenide solid solutions are particularly unstable, which is unfortunate in that they provide an excellent range of colours from yellow through red to purple. These pigments are sensitive to temperature and atmosphere and react with lead-containing fluxes and other non-cadmium pigments giving black contamination. Despite their limitations these are the only known compounds to give bright red colours for ceramic applications. In the case of plastics the cadmium sulphoselenide pigments are used because they are sufficiently stable to withstand the processing temperatures required by thermoplastics such as polystyrene and because the colour is not fugitive. However, the use of these pigments in plastics could be limited because of the possible release of cadmium.

The most notable step forward to improving the stability of sensitive pigments, especially cadmium sulphoselenides, is the protection of the pigment by inclusion of the pigment in transparent zirconium silicate crystals. Such protected pigments are sometimes referred to as inclusion pigments. In the known method, pigment ingredients, zirconium oxide powder and silicon dioxide powder are mixed with water to a dough and the resulting mixture heated to high temperature followed by grinding and removal of unwanted reaction products. Pigments made according to this method suffer from the disadvantage that it is not possible to obtain fully saturated colours when such pigments are fired on ceramic ware. This is believed to be due to the general low level of cadmium sulphoselenide pigment enclosed in the zirconium silicate crystals, which is approximately 1-2% of the total, and to the further reduction of colour saturation by the impurities silicon dioxide, zirconium dioxide, unpigmented zirconium silicate and poorly pigmented zirconium silicate, which are not removed on subsequent cleaning. The result is a pigment of a pastel rather than a saturated colour. (cf W. Volker Inclusion pigments and their use in various glaze systems "Glazes and Glazing Techniques", Conference proceedings published by the Swedish Ceramic Society 1981). The percentage reflectance of radiation for a known protected pigment is represented in graph form in FIG. 1 and will be described later.

The present invention seeks to obviate or mitigate these disadvantages of the prior pigment.

The invention provides, in a method of making a protected pigment by inclusion of a pigment in transparent zirconium silicate crystals, the step of precipitating simultaneously or sequentially the constituents of the protected pigment from aqueous or non-aqueous solutions of their salts.

The invention also provides a method of making a protected pigment by inclusion of a pigment in transparent zirconium silicate crystals comprising the steps of precipitating simultaneously or sequentially the constituents of the protected pigment from aqueous or non-aqueous solutions of their salts to form a precipitate, mixing the precipitate with a fluoride, heating the mixture to a high temperature and cleaning the protected pigment so produced.

The said constituents are preferably:
(a) a pigment or its precursor
(b) zirconium hydroxide or hydrated zirconia and
(c) silicic acid or hydrated silica.

The protected pigment made according to the method hereinbefore described contains about 8-10% cadmium sulphoselenide pigment included in the zirconium silicate crystal, and has no poorly pigmented or unpigmented zirconium silicate. The X-ray diffraction spectrum shows a peak at a d spacing of 2.96 Å, which can be assigned to a small percentage of cubic zirconium dioxide. This X-ray diffraction peak at 2.96 Å has not been detected in commercially available protected pigments. These latter contain peaks at d spacings of 2.83 Å and 3.16 Å which are barely detectable in the protected pigment made by this process, and which can be assigned to monoclinic zirconium dioxide. The cubic zirconium dioxide is apparently present in the protected pigment in a percentage, according to preliminary studies, of 3-6% by weight. When fired on ceramic ware it gives fully saturated bright colours which give no detectable release of cadmium when tested according to the procedure in: British Standard 4860: Part 1: 1972, Permissible limits of metal release from glazed ceramic ware. These bright red, orange and yellow cadmium sulphoselenide inclusion pigments can be applied to ceramic tableware in on-glaze transfer decorations fired at 800° C.–850° C. The pigments are fully compatible with the lead fluxes commonly used in on-glaze decoration. These pigments also have sufficient thermal stability to permit their use in the under-glaze decoration of tableware (firing temperature 1050° C.), and as glaze stains in tile and sanitaryware glazes (firing temperatures up to 1200° C.). In the glaze stain applications the brightness of the colour depends upon the refractive index of the glaze. The most saturated colours are obtained in high refractive index lead glazes. These glazes approach the refractive index of the zircon surrounding the pigment, and minimise the opacifying effect of the zircon. Less saturated colours are obtained in lead free glazes of lower refractive index such as are used on sanitaryware. However, the red protected pigment made according to the invention provides a much more saturated red colour in lead-free glazes than has been available hitherto.

The method of preparing protected pigments according to the invention is suitable for pigments of limited stability and particularly for cadmium sulphoselenides, cadmium-mercuric sulphides and similar sulphides containing zinc and/or tellurium, gold-tin and gold-zirconia pinks, chrome yellows, cobalt zinc blues and copper colours.

The method may be used as a "post-treatment" method on existing (unprotected) pigments and is thus desirable for use by pigment-users who desire complete freedom of formulation of their pigment. Alternatively the method is applicable to the production of protected pigments in situ.

The constituents of the protected pigment according to the invention are a pigment or its precursor, zirconium hydroxide or hydrated zirconia, and silicic acid or hydrated silica. Any soluble zirconium salt can be used to provide the zirconium component, for example zirconyl chloride, zirconium nitrate, zirconium sulphate, zirconium acetate and similar salts. A soluble silicate, for example sodium silicate, potassium silicate, lithium silicate or ethyl silicate may be used to provide the silicate component. The fluoride, preferably a metallic fluoride, for example sodium fluoride, lithium fluoride, lead fluoride, potassium fluoride, calcium fluoride or sodium aluminium fluoride, is added in amounts between 0.1 and 15% by weight, preferably between 1 and 3%. The mixture is preferably fired between 800° C. and 1300° C. desirably greater than 1000° C. for at least one minute and preferably ten to fifteen minutes. The fired product is then crushed, ground, treated with acids, alkalis and water, to remove undesired reaction products and unprotected pigment and finally dried.

Figure 2:
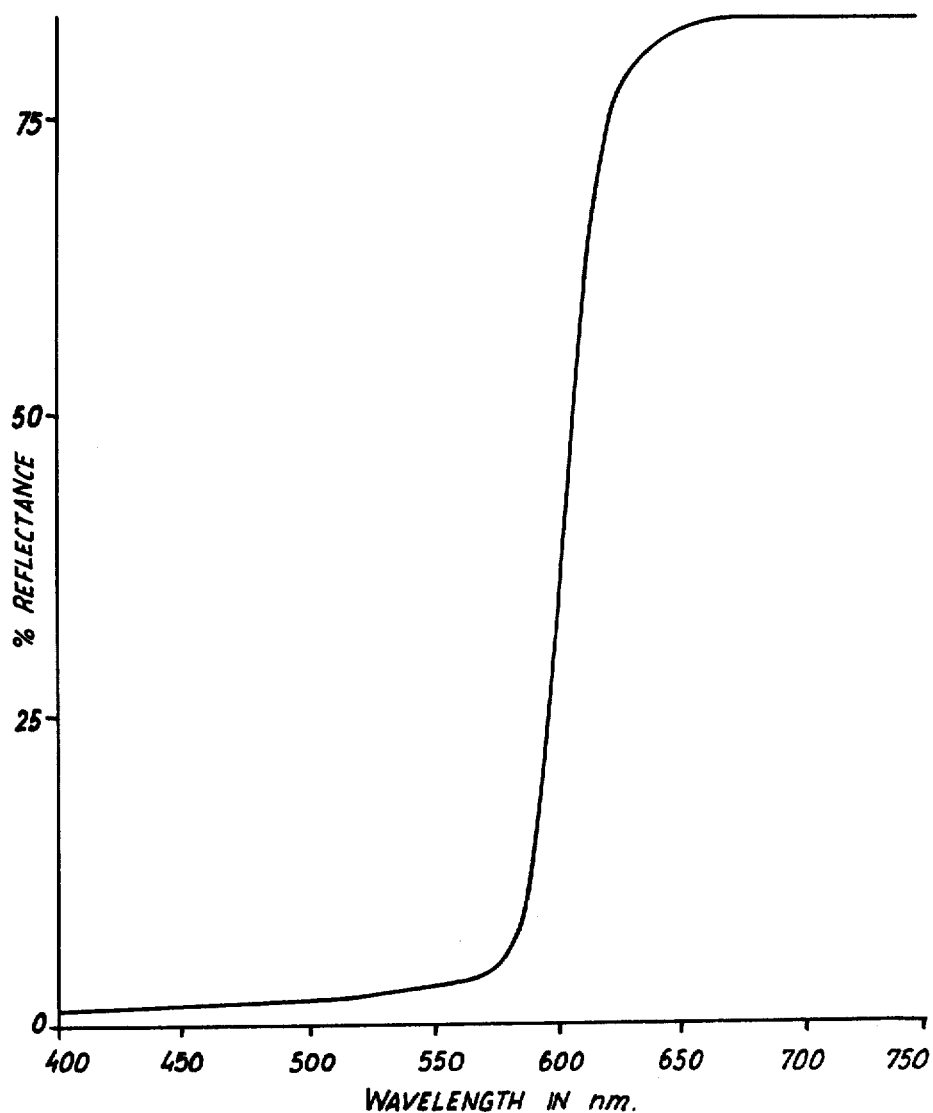

There now follows a description, by way of example only, of embodiments of the invention with reference to FIG. 2 of the accompanying drawings and for comparison a description with reference to FIG. 1 of properties of a known protected ceramic pigment.

The Figures show graphs of percentage reflectance of electromagnetic radiation for sample glazes (y-axis) against wavelength of the radiation (x-axis), FIG. 1 displaying data for a known protected ceramic pigment and FIG. 2 displaying data for a pigment made in accordance with the invention, as follows:

EXAMPLE 1

29 g of cadmium sulphate were dissolved in 200 cm$^3$ of water and then this solution was mixed with 140 g of a solution containing approximately 35% by weight of zirconium acetate.

3.6 g of selenium powder was dissolved in a sodium sulphide solution (28 g dissolved in 1000 cm$^3$ of water) and was then made alkaline by adding ammonium hydroxide solution.

The two solutions were mixed together and the precipitate obtained was washed, filtered and dried. The dry powder was then mixed with 35 cm$^3$ of sodium silicate solution diluted to 200 cm$^3$ with water and neutralised with acid to produce a gel. The gel was washed with water, filtered and dried at 130° C. to give a fine powder. This powder was dry-mixed with 3% by wt. of lithium fluoride and fired in a closed crucible at 1050° C. for 30 minutes. The resulting red pigment composition was ground in a ball mill, and then washed with a mixture of concentrated sulphuric acid and concentrated nitric acid. This was followed by washing with water, then with 5M sodium hydroxide and finally with water. The resulting red protected pigment contained 5.9% by wt. of cadmium. The red protected pigment was completely stable to acids and alkalis and to temperatures of 1200° C. It produced bright red colours in on-glaze decoration on tableware. The on-glaze decoration was applied to a bone china plate as a block of colour 1 dm$^2$ in the form of a silk screen water-slide transfer. The on-glaze transfer was made up from 1 part of the red pigment to 2 parts of lead flux. After application to the plate and firing at 800° C. a bright red block of colour was obtained. The cadmium release from this decoration was below the limits of detection of the procedure in BS. 4860: Part 1: 1972. Measurements of the colours produced in the on-glaze decoration and in glaze stain applications are given below.

| Application | Firing Temp. °C. | Colour Co-ordinates CIELAB 1976 | | |
|---|---|---|---|---|
| | | L* | a* | b* |
| On-glaze screen transfer | 800 | 46.6 | 64.7 | 55.9 |
| 5% Pigment in a lead based tile glaze | 1060 | 35.8 | 58.8 | 49.8 |
| 5% Pigment in a lead free sanitary ware | 1200 | 46.6 | 45.9 | 38.8 |
| 8% known commercial red protected pigment in a lead based tile glaze (for comparison) | 1060 | 49.5 | 44.2 | 40.9 |

Footnote
Conditions of colour measurement:
2° observer;
illuminant C;
specular reflection excluded.

The high purity of the red pigment is revealed by the reflectance spectrum for the on-glaze decoration shown in FIG. 2.

By comparison the reflectance spectrum of a lead based tile glaze containing 8% by wt. of a known commercial protected pigment is shown in FIG. 1, reveals the lack of purity and lack of intensity of the red colour.

EXAMPLE 2

108 g of zirconyl chloride and 28 g of cadmium sulphate were dissolved in 500 cm$^3$ of water. This solution was then added to a solution of 28.5 g of sodium sulphide dissolved in 1 dm$^3$ of water and containing ammonium hydroxide.

The resultant precipitate was decanted, filtered and dried at 130° C., then added to 60 cm$^3$ of sodium silicate solution (S.G. 1.42) diluted to approximately 250 cm$^3$ with water. The solution was gelled as described in Example 1. The fine powder thus obtained was dry mixed with 1% by wt. of lithium fluoride and fired in a crucible at 1050° C. for 15 minutes. The resulting yellow pigment composition was ball milled and washed with acids and alkali by the procedure given in Example 1.

The resulting bright yellow protected pigment gave the following colour co-ordinates in ceramic applications when measured under the same conditions as in Example 1.

| Application | Firing Temp. °C. | Colour Co-ordinates CIELAB 1976 | | |
|---|---|---|---|---|
| | | L* | a* | b* |
| On-glaze screen transfer | 800 | 86.6 | −9.3 | 114.5 |
| 5% Pigment in lead based tile glaze | 1860 | 81.1 | −6.1 | 101.2 |
| 5% Pigment in lead free sanitaryware glaze | 1200 | 79.8 | −7.0 | 95.1 |

EXAMPLE 3

A red/purple gold colloid was prepared in the normal manner on hydrated zirconia, from a solution of zirconyl chloride and chloroauric acid. The precipitate was filtered and mixed damp with sodium silicate solution which was neutralised to precipitate silicic acid. The mixture was filtered, washed and dried to a powder which was then mixed with 3% by weight LiF and fired in a closed crucible for ten minutes at 1000° C.

The reaction product was worked up by the procedure described in Example 1 to give a purple protected pigment stable to temperatures >1100° C.

EXAMPLE 4

The red and yellow protected pigments made by the process described in Examples 1 and 2 were ball milled for 24 hours to give finely divided protected pigments suitable for plastics applications. After ball milling the protected pigments had specific surface areas by nitrogen adsorption of approximately 10 m$^2$/g. These two protected pigments were added to polystyrene at the 3.3% level. The polystyrene was melted and moulded into plaques and gave the following colour co-ordinates measured under the conditions given in Example 1.

|  | Colour Co-ordinates CIELAB 1976 | | |
| --- | --- | --- | --- |
|  | L* | a* | b* |
| 3.3% red protected pigment (Example 1) | 40.6 | 44.3 | 35.2 |
| 3.3% yellow protected pigment (Example 2) | 69.0 | −7.7 | 74.3 |

The zircon protected pigments prepared according to this invention provide the following benefits compared with the pigments of this type currently available.

(1) The reaction ingredients are finer and more reactive, resulting in a higher proportion of pigment in the protecting crystals and correspondingly higher pigmentation density in the zircon crystals. Thus the protected pigments are of a much higher colour saturation for a given particle size. Alternatively for a given saturation, particles can be much finer.

(2) These highly colour saturated protected pigments maintain excellent stability to heat and acids.

(3) The protected pigments produced by this method are more reproducible in colour and particle size because of the improved control of the zircon inclusion facilitated by the invention.

(4) There is better uniformity of particles with little or no unreacted or unpigmented material. The protected pigment is composed of particles of a single uniform colour which results in more uniform colours when fired on ceramic ware.

It is to be understood that inclusion pigments produced according to the invention are especially suitable for ceramic applications and this is indeed their principal application. However such pigments are also suitable for use in other applications for example plastics. Although the temperature stability of the pigments is well within the range of temperatures used in plastics manufacture, the principal advantage in using pigments according to the invention in plastics is that there is no release of toxic materials from the pigment when the plastics are incinerated or are exposed to materials such as food and other products which would otherwise attack unprotected pigments.

We claim:

1. A method of making a protected pigment by inclusion of a pigment in transparent zirconium silicate crystals comprising the steps of:

precipitating simultaneously from solutions of their salts a pigment and a zirconium compound;

thereafter, in the presence of the precipitate so formed, precipitating a silicon compound from a solution of its salts;

dry mixing the resulting precipitate with between 0.1 and 15 weight % of a metallic fluoride; heating the resulting mixture to a temperature between 800° C. and 1300° C. for a time of between 1 and 30 minutes;

cleaning the protected pigment so formed; and wherein the pigment or its precursor is chosen from the group consisting of a sulphide, selenide or telluride of zinc, cadmium or mercury or a mixed crystal thereof, gold-tin pinks, gold-zirconium pinks, chrome yellows, cobalt-zinc blues and copper colors, or precursors thereof.

2. A method as claimed in claim 1, in which the zirconium compound is selected from the group consisting of zirconium hydroxide and hydrated zirconia.

3. A method as claimed in claim 1, in which the silicon compound is selected from the group consisting of silicic acid or hydrated silica.

4. A method of making a protected pigment according to claim 2, wherein the zirconium hydroxide or hydrated zirconium has a zirconium component provided by a soluble zirconium salt chosen from one or more the group consisting of zirconium nitrate, zirconyl chloride, zirconium sulphate and zirconium acetate.

5. A method of making a protected pigment according to claim 3, wherein the silicic acid or hydrated silica has a silicon component provided by a soluble silicate chosen from the group consisting of sodium silicate, potassium silicate, lithium silicate and ethyl silicate.

6. A method of making a protected pigment according to claim 1, wherein the metal of the fluoride is at least one selected from the group consisting of aluminium, lithium, lead, potassium, calcium and sodium.

* * * * *